(12) United States Patent
Gish

(10) Patent No.: US 6,273,029 B1
(45) Date of Patent: *Aug. 14, 2001

(54) ANTI-TANGLE/TWIST MULTI-ANIMAL WALKING LEASH

(76) Inventor: Panje L. Gish, 6716 Luciernaga Pl., Carlsbad, CA (US) 92009

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/210,059

(22) Filed: Dec. 10, 1998

Related U.S. Application Data

(63) Continuation-in-part of application No. 08/504,150, filed on Jul. 19, 1995, now Pat. No. 5,852,988.

(51) Int. Cl.$^7$ .................................................. A01K 27/00
(52) U.S. Cl. ............................................. 119/792; 119/795
(58) Field of Search ..................... 119/769, 792, 119/795, 793, 797, 798, 787, 770

(56) References Cited

U.S. PATENT DOCUMENTS

| | | | |
|---|---|---|---|
| 2,289,802 | * 7/1942 | Norton | 119/793 |
| 2,737,154 | 3/1956 | Michonski . | |
| 2,827,017 | 8/1958 | Ryan . | |
| 2,909,154 | 6/1959 | Thomas . | |
| 3,120,403 | 2/1964 | Molzan . | |
| 3,311,088 | 3/1967 | Peterlin . | |
| 3,603,295 | * 9/1971 | Shuman | 119/795 |
| 3,752,127 | 8/1973 | Baker . | |
| 3,884,190 | 5/1975 | Gurrey . | |
| 4,019,463 | * 4/1977 | Kitchen | 119/793 |
| 4,541,364 | * 9/1985 | Contello | 119/772 |
| 4,563,981 | 1/1986 | Kramer . | |
| 4,879,972 | 11/1989 | Crowe et al. . | |
| 4,892,063 | 1/1990 | Garrigan . | |
| 4,932,362 | * 6/1990 | Birchmire, III et al. | 119/772 |
| 5,005,527 | * 4/1991 | Hatfield | 119/793 |
| 5,632,234 | * 5/1997 | Parker | 119/795 |
| 5,701,848 | * 12/1997 | Tozawa | 119/797 |
| 5,839,394 | * 11/1998 | Dickison | 119/795 |
| 5,852,988 | * 12/1998 | Gish | 119/795 |
| 5,901,668 | * 5/1999 | Goodger, Sr. | 119/795 |

FOREIGN PATENT DOCUMENTS

| | | |
|---|---|---|
| 26249 | 2/1912 | (GB) . |
| 2039705 | 8/1980 | (GB) . |

* cited by examiner

Primary Examiner—Peter M. Poon
Assistant Examiner—James S. Bergin
(74) Attorney, Agent, or Firm—Brown Martin Haller & McClain LLP

(57) ABSTRACT

Leash apparatus providing a user the ability to conveniently secure and walk two or more animals, especially dogs, from a single leash handle, without encountering the usual frustration of impossibly intertwined leashes as the animals move about. The leash apparatus is a combination assembly of swivels to which each leash of a plurality of leashes is attached, with each leash either terminating in a loop collar for one of the animals or having further extending from its distal end, through a swivel, at least one successive leash, the most distal of which terminates in such a loop collar. The handle essentially includes a primary swivel ring of size to receive two snap-hooks of multiple leashes arranged either in "series" or in "duplex." Incorporation of the loop collars allows use of the apparatus without needing to have a fixed collar on each of the animals, and also allows control of unruly animals by the choke function of some configurations of the loop collars described. The apparatus enables animals of different sizes to walk around, over or under each other without requiring the walker to constantly disconnect, untangle and reconnect the respective leashes in order to resume orderly walking.

6 Claims, 2 Drawing Sheets

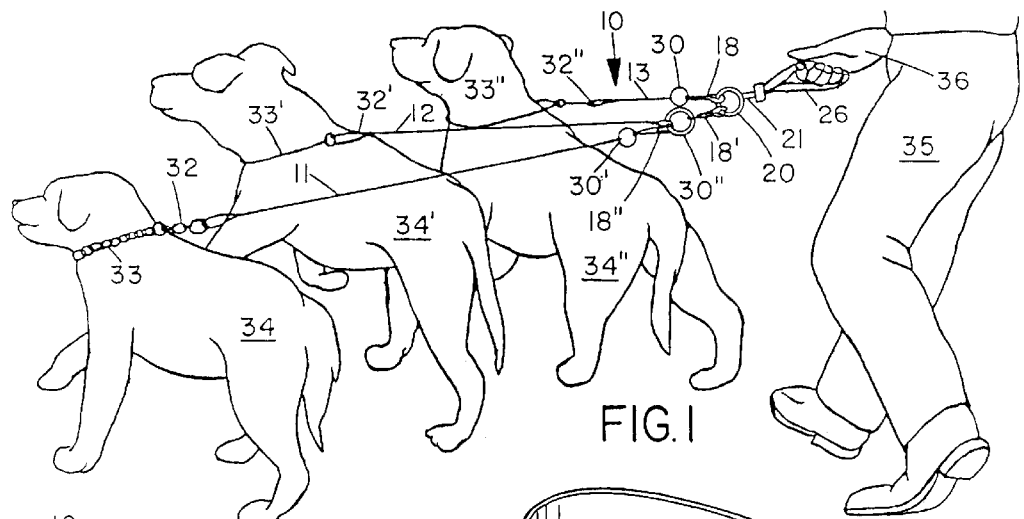
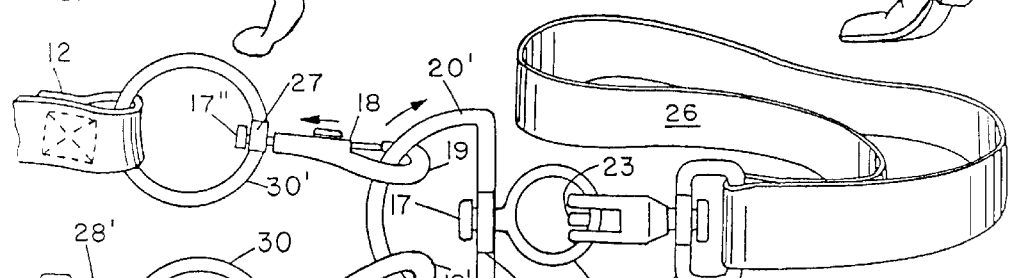
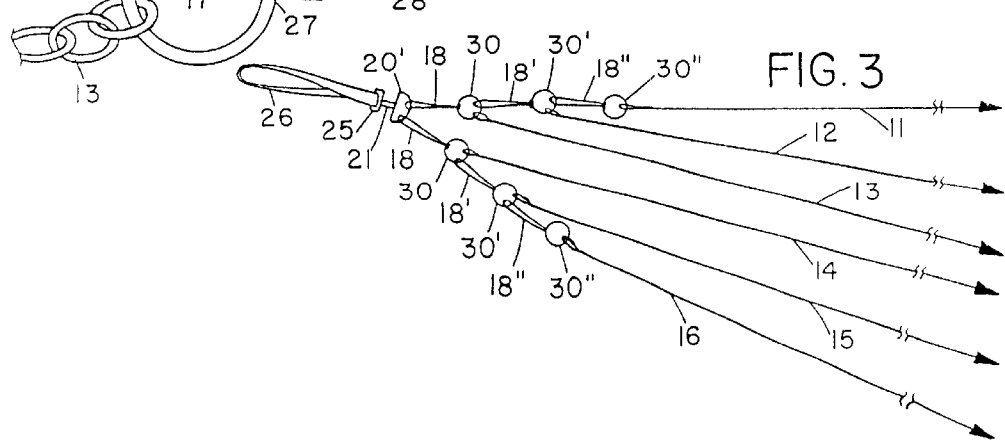

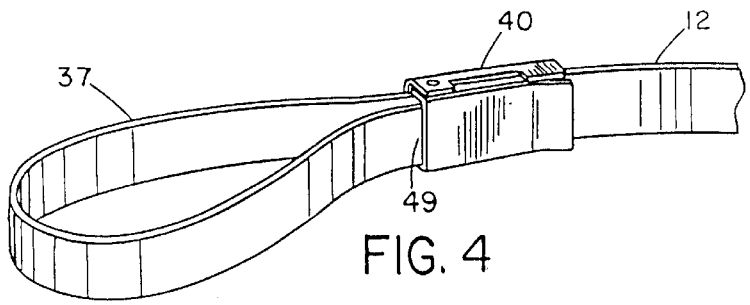
FIG. 4
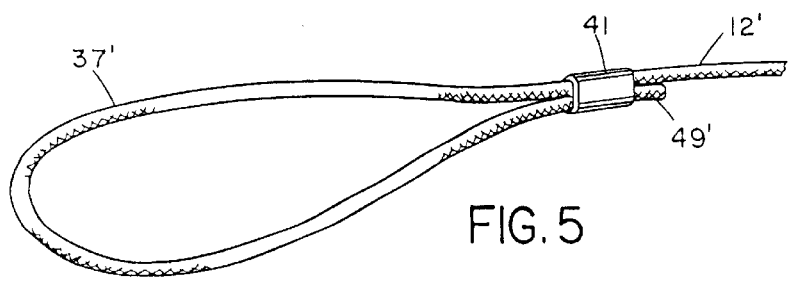
FIG. 5
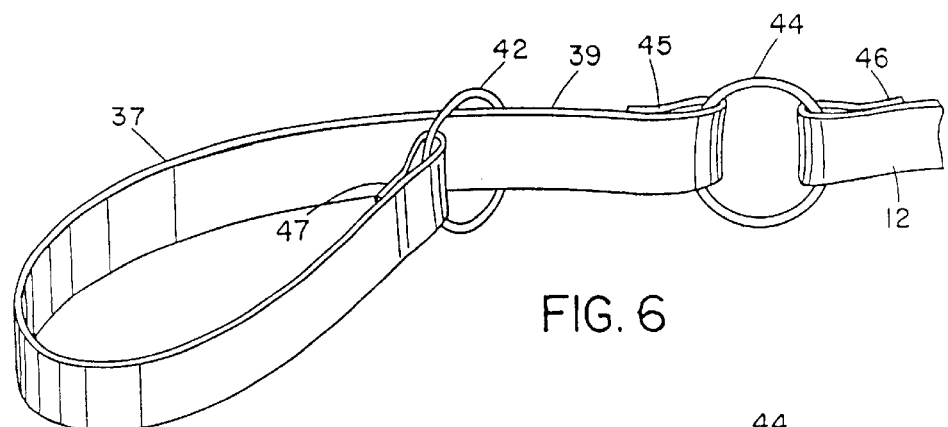
FIG. 6
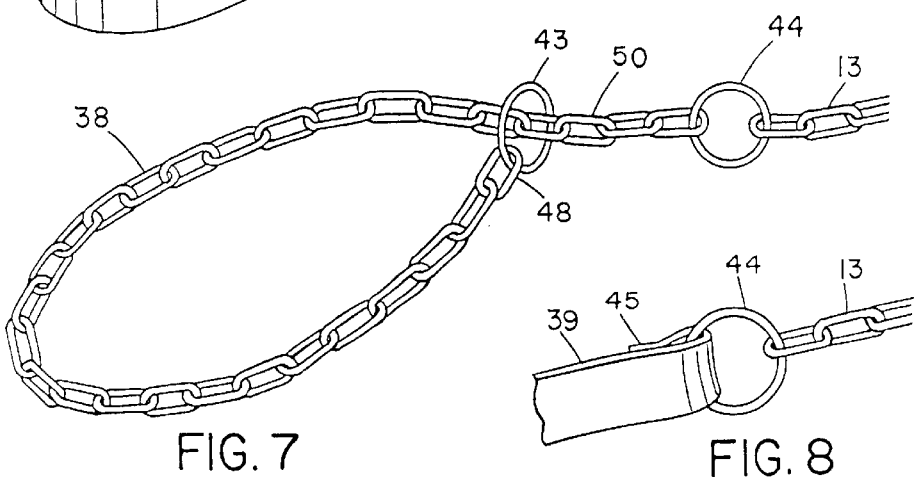
FIG. 7
FIG. 8

ANTI-TANGLE/TWIST MULTI-ANIMAL WALKING LEASH

CROSS-REFERENCE TO RELATED APPLICATION

This application is a continuation-in-part of application Ser. No. 08/504,150, filed Jul. 19, 1995 now U.S. Pat. No. 5,852,988, of like title.

BACKGROUND OF THE INVENTION

1. Field of the Invention

This invention relates to animal walking-leashes, and more specifically it relates to those types of leashes facilitating control of one or more pet animals, most especially dogs.

2. Description of the Prior Art

U.S. Pat. No. 2,827,017 shows a dog leash having snap-hooks arranged at both extreme opposite ends; a first snap-hook being attached outwardly to the dog's collar, a second snap-hook arranged at the opposite end of the leash being capable of forming a loop portion serving as a walking handle when that second snap-hook is secured to a D-ring integrally formed on the leash a short distance from the second snap-hook. There is no contemplation of tangle-free walking of two dogs therefrom.

In U.S. Pat. No. 2,909,154 is also shown a dog leash having snap-hooks arranged at both extreme opposite ends; a first snap-hook being attached outwardly to the dog's collar, the second snap-hook being attached inwardly to a D-ring permanently secured to an adjustable-belt encircling a car's seatback. Also included at the inward-end of the leash is a loop portion serving as a walking handle; but there is no provision for walking two dogs in a tangle-free manner.

In U.S. Pat. No. 3,120,403 a cargo-sling apparatus for a helicopter Is shown; including a ring portion, from which a plurality of leash like adjustable-straps depend. Each of the straps is secured to the ring portion by being looped there around and sewn to Itself, while remaining slidable about the ring. There is no contemplation of tangle-free operation.

U.S. Pat. No. 3,752,127 also shows a dog leash having snap-hooks arranged at both extreme opposite ends; a first snap-hook being attached outwardly to the dog's collar, a second snap-hook arranged at the opposite end of the leash where is formed a loop portion serving as a walking handle. When the second snap-hook is optionally secured to a D-ring Integrally formed on the leash a short distance from the first snap-hook, the leash length is thereby effectively halved to provide a much shorter walking leash. There is no contemplation of tangle-free walking of two dogs therefrom.

In U.S. Pat. No. 3,884,190 a dog leash is shown having snap-hooks arranged at both extreme opposite ends; a first snap-hook being attached outwardly to the dog's collar, a second snap-hook arranged at the opposite end of the leash where it is formed in a loop portion to serve as a walking handle. The outward snap-hook includes a swivel-eye portion, while a swivel-eye with a D-ring is also included inward near the handle so that when the second snap-hook is secured to the D-ring portion, the outwardly extending leash portion may rotate freely relative to the handle. Additionally, a tempered steel wire is integrated into the length of the leash, so as to effect a recoiling spring action. There is no contemplation of tangle-free operation relative to any other hand leash.

In U.S. Pat. No. 4,563,981 a D-shaped handle is shown having a plurality of leashes dependent there from; thereby providing a group tether apparatus said suitable for imparting directional walking control to children spaced at regular intervals grasping its leash-like length. There is no contemplation of tangle-free operation.

Finally, in U.S. Pat. No. 4,892,063 a leash apparatus for at least two dogs is shown, wherein a single length of leash strap is passed through a sleeve like hand-grip member. Snap-hooks with swivel-eyes are included at the opposite ends of the U-shaped leash, thereby facilitating discrete attachment to two dogs relative to the single sleeve hand-grip. A D-ring Is included mid-length of the double-ended primary leash, whereby one or two additional leashes may be snap-hooked thereto if desired. However, there is no contemplation of tangle-free operation.

SUMMARY OF THE INVENTION

In the parent application hereto, an invention was described and claimed of a walking leash capable of accommodating more than one animal in a manner very resistant to entanglement of their respective individual leash leads. With the new multi-pet walking-leash one may confidently proceed with their pets, allowing walking, stopping, intermingling, and even crossing over of one pet relative to another. This invention was a significant improvement over conventional leash devices, which frequently required the walker to frequently stop to untangle the confusingly entangled array of leashes.

The device of the parent application defined an anti-tangle multiple-pet leash apparatus made of any conventional leash type linear material, such as nylon webbing, leather strap, chromed chain, or plastic clad metal cable. A substantially conventional flexible closed loop type handle portion for secure hand control by the walker, and included a primary swivel-eye member permanently joined thereto. This swivel-eye member is preferably a metal D-ring or substantially equivalent metal O-ring of sufficient size as to spatially accommodate attachment of one, two, three, or more discrete subleashes in restraint of one's pets (which are generally domestic dogs). This special handle configuration with it's primary swiveling-ring member, in combination with special Individual leashes, each having a snap-hook with a secondary swiveling-ring included at their inward distal end constituted the claimed invention.

The present application is directed to an improvement in that prior invention, in which the anti-tangle twist leash device includes, rather than the previously defined snap-hook coupling member for securement to a pet's fixed-size collar, a loop collar member for securement of the leash to the pet. Such improvement allows for securement of the leash to the pet in the absence of a regular collar being worn by the pet. Various embodiments also allow for an improved degree of control of a pet while being walked.

BRIEF DESCRIPTION OF THE DRAWINGS

FIG. 1 is a pictorial view depicting the invention in normal use, as exemplified by a walker in control of three dogs;

FIG. 2 is a greatly enlarged detail view of a leash handle where it is coupled with three successive leashes (only partially shown);

FIG. 3 is a semi-diagrammatic fragmented plan view representation, demonstrating how still additional multiples of successive leashes can be accommodated.

FIGS. 4–7 are pictorial views of the loop collar members of this invention, including both slide and ring structures for forming and sizing the loop collars.

FIG. 8 is a detail view of an alternative leash linkage for the embodiment of the loop collar depicted in FIG. 7.

DETAILED DESCRIPTION AND PREFERRED EMBODIMENTS

Considering first FIG. 1, there is depicted the overall invention 10 with an exemplified multiplicity of pet dogs 34, 34', 34", shown here leading their walker 35 in a right-to-left direction. By virtue of the size of the collective leash ring 20, the walker 35 can simultaneously control by a single hand 36 a plurality of individual discrete primary dog primary leash 13, secondary leash 12 and tertiary leash 11 without difficulty.

The single preferably loop type handle 26 incorporates a swivel-eye device 21 capable of continuous rotation on a shank-axis proximally colinear with the general directional orientation of the primary or leading leashes 12 and 13 and secondary or sub-leash 11. The basic apparatus thus serves to enable the user to add or delete still other secondary leashes in doubling series as desired, in quick and easy manner, without impairing the ability of the apparatus to automatically compensate for activity of the pets which would have, with conventional leashes, resulted in significant entanglement of the various leashes. The preferred leash apparatus of this invention is a duplex system (two basic co-depending leashes), to which additional individual primary or secondary leashes may be added or subsequently removed as needed. A maximum of two primary leashes are permitted, since more than two will have the potential for tangling together as the pets move about.

FIG. 2 illustrates in greatly enlarged detail the combination of a generously sized D-ring 20' and the accompanying swivel-eye device 21 having fixed shank-terminus 17, which cooperate to defeat entanglement of the individual leash lines 11,12 and 13. Note while the metal D-ring configuration exhibited in FIG. 2 is preferred, the equivalent sized rigid O-ring device of FIG. 1 will suffice as well. Also illustrated in FIG. 2 is the additional convenience option of a conventional quick-release catch device of the type here incorporating bifurcated fingers 23, which can be readily tripped in the event that the walker 35 desires to let all the dogs run together in a suitable open space. This can be a safety release as well in some instances. A secondary swivel-eye device 24 is also indicated, but it is not essential to the reliable operation of the anti-tangle function.

In general, the leash material is attached to the hardware members via a traditional secured loop; that is, it is wrapped around a buckle-like portion and sewn there permanently upon itself. There remain subtle, however vital, other differences which will become more evident and understood as important provisions as described below.

For example, FIGS. 2 and 3 also illustrates desirable provision, which is that of swivel-eyes 17', 17" joined with the respective leases 12", 13", and respective snap-hook devices 18, 18', each having integral respective finger portions 19, 19' thereto. This swivel-eye provision gives the additional advantage of an anti-twist function, to effectively abate tendency toward intra-twisting of sub-leash units.

FIG. 3 illustrates another significant aspects of the multiple-pet leash apparatus of this invention, wherein the special anti-tangle combination is further defined by arranging three or more leashes coupled in "series" or in "duplex." The primary swivel ring device functions perfectly when only two dogs are being walked, in as much as both leashes (designated as primary leashes) are free to move with respect to one another. However, introduction of a third dog's leash requires that the third leash be employed as a secondary (or sub-) leash, whereby the snap-hook of the third leash is attached not to the primary swivel ring, but instead to a secondary swivel ring rotating upon the snap-hook of one of the two primary leashes connected to the primary swivel ring. At each junction of a series or duplex connection described below, it is preferred that no more than two connections be made.

A fourth leash (second sub-leash) may further be connected in either series or dual-series arrangement to the aggregation, and yet additional sub-leashes may further be added. A so-called series connection is realized by connecting the snap-hook of the fourth leash upon the swivel ring of the third leash, such that the fourth leash in this configuration is a tertiary (or sub-sub-) leash. A so-called duplex connection arrangement is attained by connecting the snap-hook of the fourth leash upon the swivel ring of the original second leash. In other words, a series connection arranged for six dogs would find five successive leashes, each dependent from the swivel ring of the preceding snap-hook, while a duplex arrangement for six dogs would find two secondary leashes dependent from the swivel rings of the first primary dog leash, plus two more secondary leashes dependent from the swivel rings of the second primary dog leash attached to the primary swivel ring at the handle.

While the primary swivel-eye provided at the handle portion Is absolutely essential to the advantageous operation of this leash invention, it is also desirable to include a secondary swivel-eye at the outward snap-hook end of each leash, because this optional provision helps negate possible intra-twisting of those individual sub-leashes. Accordingly, it can be understood that by virtue of the special collective handle ring member 20, in combination with the strategically located continuously rotational primary swivel-eye units 21 (essential) and 17(optional), even the most sprightly of animals, which may excitedly intermingle in the most confusing of ways, cannot result in entanglement of the individual leash leads (which may be from two to five or more for example).

FIGS. 4–7 illustrate the use of loop collars with the present device instead of the fixed collars described in the parent application. In FIG. 4 a leash such as 12 is illustrated as terminating not in connection to a swivel clip which attaches to the pet's fixed collar (as described in the parent application) but rather as terminating at its distal end 49. An adjustable clamp 40 is slid over the leash 12 at the distal end 49 and then moved up the leash 12 until a length of distal free leash is reached which allows for formation of a loop 37 which is slightly larger that the pet's head. Distal end 49 is then slid under the clamp 40 but the clamp 40 is not yet secured. The loop 37 is then placed over the pet's head and moved until it encircles the pet's neck. With distal end 49 still within the clamp 40, the clamp 40 is moved distally along leash 12 until loop 37 is diminished in size until it closely encircles the pet's neck and is too small to slide backwards over the pet's head. The adjustable clamp 40 is then closed so that distal end 49 and the main part of the leash 12 are tightly clamped together, securing the size of loop 37. Thus the pet is fully restrained by the leash 12 but no separate fixed collar is required. When it is desired to release the pet from the leash, clamp 40 is opened and either distal end 49 is freed, thus eliminating loop 37, or the clamp 40 is slid proximally along the leash 12 until the loop 37 is sufficiently enlarged to again be slipped over the pet's head, in either case releasing the pet from the leash.

An alternative embodiment is shown in FIG. 5, in which a leach 12' (in a round cable configuration, rather than the flat belt configuration of leash 12 of FIG. 4) again forms a loop 37' by having a distal end 49' fitted under a sliding clasp 41. Clasp 41 fits over leash 12' and distal end 49' with an interference fit, such that it resists the tendency of the distal end 49' to be pulled out of the clasp, but still allows for the walker 35 to move the clasp along the leash 12' (with some effort and against resistance, of course) to adjust the size of the loop 37' either to secure the leash around the pet's neck or to allow passing the loop over the pet's head as described above for FIG. 4. This embodiment is less preferred than that of FIG. 4, since repeated movement of the leash 12' through the clasp 41 will eventually reduce the frictional resistance of the lease and make the loop 37' harder to maintain as the pet moves about.

The embodiment of FIG. 6 is another alternative to that of FIG. 4. In the FIG. 6 embodiment leash 12 terminates in a conventional securement to O-ring 44, as by a conventional sewn fold 46. A length of leash material 39 is also attached to O-ring 42, preferably by a similar sewn fold 45, at the proximal end, and is attached to a second O-ring 42 at the distal end, also preferably by a sewn fold 47. O-ring 42 is mounted on the length 39 of leash material so that it can move freely along the length of material and form loop 37. The loop 37 can then be adjusted in size to fit over the pet's head or be drawn in around its neck, as described above. Because the ring 42 moves freely along the length 39 of material, the loop 37 can be pulled tight around the pet's neck by the walker 35 if the pet becomes unruly, in the manner of a choke collar. This continually adjustable feature is also important if the pet 34 (or 34' or 34") is to be shown at organized pet shows, since most kennel clubs and similar organizations sponsoring judged animal shows require that the pet be kept under close and continual control during the showing.

A loop collar similar to that of FIG. 6 but utilizing a chain instead of leash material is illustrated in FIG. 7. Primary chain 13 is attached to O-ring 44 by a conventional closure link and a second length 50 of the same or a similar chain is also attached at its proximal end to ring 44. The second chain 50 is attached at its distal end 48 to an O-ring 43 to form loop 38, in the same manner that leash material 39 forms loop 37 in the FIG. 6 embodiment. An advantage of the FIG. 7 embodiment is that a chain may be better suited to restrain of larger pets, such a large dogs.

Finally, FIG. 8 shows a detail of a hybrid device combining the leash material 39 with a chain 13.

In all cases, the loop collars of this invention are formed by the leash itself (or extensions of the leash material) and do not rely at all on a separate collar worn by the animal. Thus this invention is ideally suited for use when it is difficult to secure a separate collar on the animal, or when the situation is such (as at some animal shows) that a separate collar would have to be repeated placed on and removed from the animal.

Numerous examples of the anti-tangle twist leashes of the present invention are contemplated to be included in the line of commercial multi-pet leashes available under the Panje MULTIPET-WALKER™ trademark from the Panje Mfg. Mkt. Co.

Thus, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended claims set out the scope of the invention sought, and are to be construed as broadly as the terminology therein employed permits, reckoning that the invention comprehends every use of which it is susceptible. Accordingly, the embodiments of the invention in which an exclusive property or proprietary privilege is claimed, are defined by the claims below.

ITEMIZED NOMENCLATURE REFERENCES NOT ELSEWHERE CITED

14 leash
15 sub-leash
16 sub-leash
18" inward snap-hook
19" snap-hook's finger
22 handle release-ring (optional)
25 handle buckle
27 inward snap-hook/swivel-ring eyelets
28/28' outward snap-hooks
30/30'/30" inward snap-hook/swivel-rings
32/32'/32" inward snap-hook/swivel-eye terminuses
33/33'/33" existing dog-collars

I claim:

1. An anti-tangle multi-pet walking leash apparatus, whereby pets coupled thereto may pursue activity heretofore causing disabling entanglement; comprising the combination of:

a handle for hand control by a pet walker, said handle including a primary swivel ring for receiving up to two attachable snap-hooks dependent therefrom;

a first inward snap-hook attached to said primary swivel ring and outwardly including a secondary swivel ring affixed to one end of an elongated flexible primary leash, said primary leash directly at an opposite end thereof or indirectly through at least one secondary leash extending from said opposite end thereof terminating in a loop collar for manual encirclement around an existing pet's neck and securement thereby of said pet through said primary leash to said handle;

said secondary swivel ring capable of likewise receiving up to two additional secondary leashes for securement through loop collars respectively to other existing pets.

2. Apparatus according to claim 1, wherein said primary leash has at least one secondary leash extending therefrom, said primary leash having affixed at said opposite end a first swivel-eye and said secondary leash having at an end proximal thereto an inward snap-hook for attachment to said first swivel-eye, thereby preventing tangling of said secondary leash with any primary or other secondary leash.

3. Apparatus according to claim 2, wherein said secondary leash has at least one tertiary leash extending therefrom, said secondary leash having affixed at an end opposite said end proximal a second swivel-eye and said tertiary leash having at an end proximal thereto an inward snap-hook for attachment to said second swivel-eye, thereby preventing tangling of said tertiary leash with any primary, secondary or other tertiary leash.

4. Apparatus according to claim 1, wherein said handle includes a quick release attachment to said primary swivel ring.

5. Apparatus according to claim 1, wherein said handle is fabricated from an elongated flexible leash material.

6. Apparatus according to claim 1, wherein each said leash is fabricated from an elongated flexible leash material.

* * * * *